Aug. 3, 1965   D. N. JOHNSTON   3,198,478
GATE VALVE OPERATING MECHANISM
Filed May 11, 1962   3 Sheets-Sheet 1

INVENTOR.
DONALD N. JOHNSTON,
BY
McMorrow, Berman & Davidson
ATTORNEYS.

Aug. 3, 1965  D. N. JOHNSTON  3,198,478
GATE VALVE OPERATING MECHANISM
Filed May 11, 1962  3 Sheets-Sheet 2
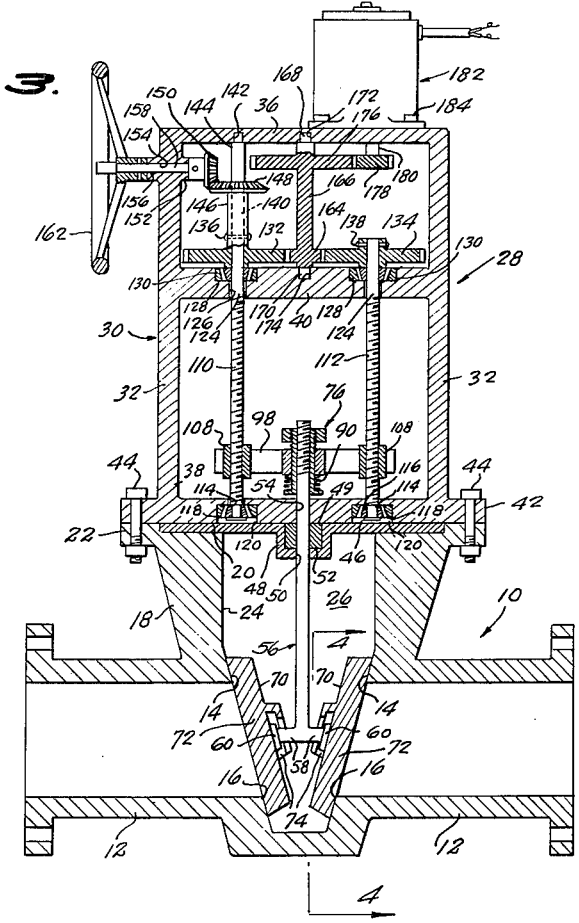
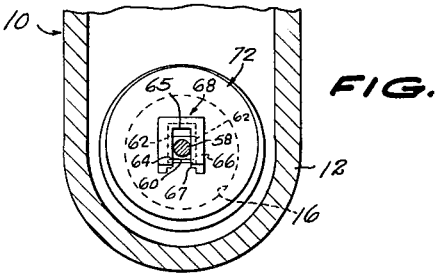
INVENTOR.
DONALD N. JOHNSTON,
BY
*McMorrow, Herman & Davidson*
ATTORNEYS.

Aug. 3, 1965 D. N. JOHNSTON 3,198,478
GATE VALVE OPERATING MECHANISM
Filed May 11, 1962 3 Sheets-Sheet 3
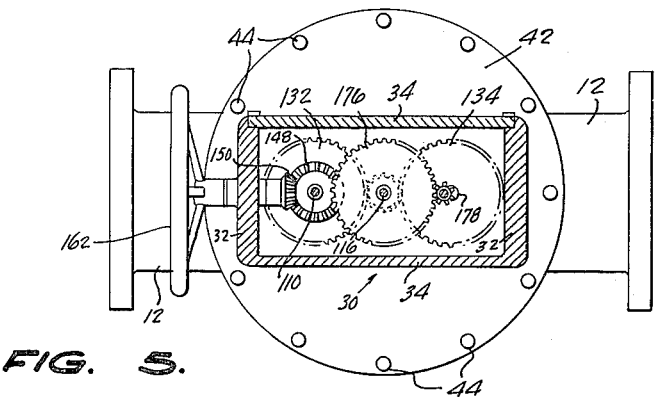
FIG. 5.
FIG. 6.
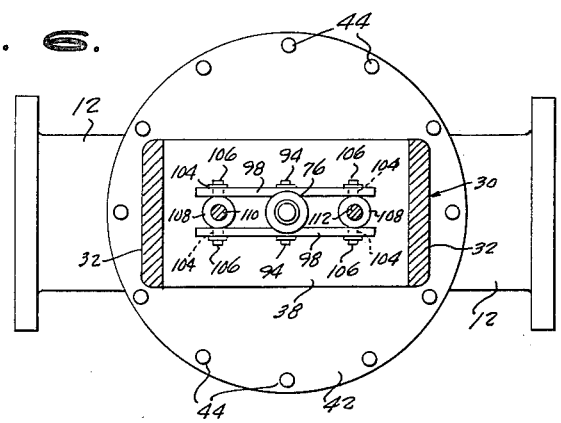
FIG. 7.
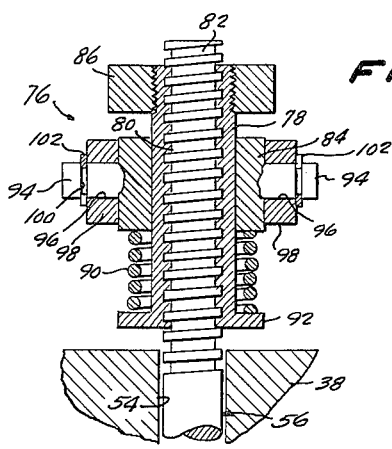
INVENTOR.
DONALD N. JOHNSTON,
BY
McMorrow, Berman & Davidson
ATTORNEYS.

United States Patent Office 3,198,478
    Patented Aug. 3, 1965

3,198,478
    GATE VALVE OPERATING MECHANISM
    Donald N. Johnston, 29 Rose Ave., Cottage Hills, Ill.
    Filed May 11, 1962, Ser. No. 193,915
    3 Claims. (Cl. 251—85)

This invention relates to improvements in gate valves, and more particularly to novel mechanism for operating the valves, the mechanism being capable of manual or electric motor actuation.

The primary object of the invention is the provision of a mechanism of the kind indicated which involves two lead screws which are geared together and to the drive component and which are operatively threaded through a cross bar, to which a single valve operating shaft is connected, the valve means being supportably connected to a valve operating shaft.

Another object of the invention is the provision of simple, efficient, and safe mechanism of the character indicated above, which eliminates the damaging effects of excessive pressure being exerted on the valves as the valves are closed, by the provision of spring means interposed between the cross bar and the shaft.

A further object of the invention is the provision of a gate valve involving novel operating mechanism of the character indicated above, wherein a pair of opposed and divergent valve discs is involved, which are carried by the valve operating shaft, for closing opposed divergent valve ports, the operating shaft having means for wedging the valve discs into closing relative to the ports, the degree of wedging force being determined and limited by the tension of the spring means, so that, in the event of over-operation, either manual or by the motor, even in the presence of limiting switches in the motor circuit, over-wedging of the valve discs is prevented.

Other important objects and advantageous features of the invention will be apparent from the following description and the accompanying drawings, wherein, for purposes of illustration only, a specific form of the invention is set forth in detail.

In the drawings:

FIGURE 3 is a vertical longitudinal section taken on the line 3—3 of FIGURE 1, showing the valve discs in closed position;

FIGURE 4 is a fragmentary vertical transverse section taken on the line 4—4 of FIGURE 3;

Figure 1:
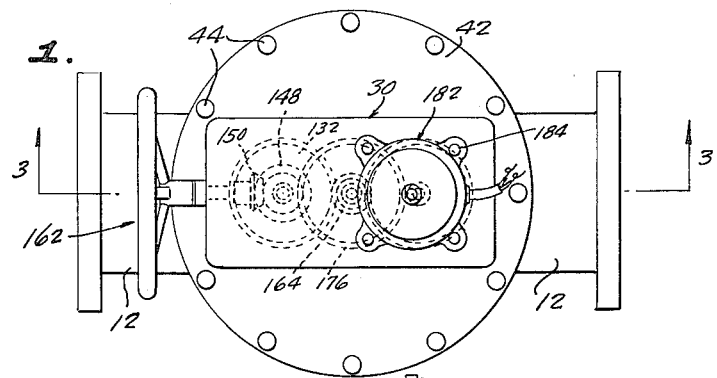
FIGURE 1 is a top plan view of a gate valve embodying operating mechanism of the present invention.
Figure 2:
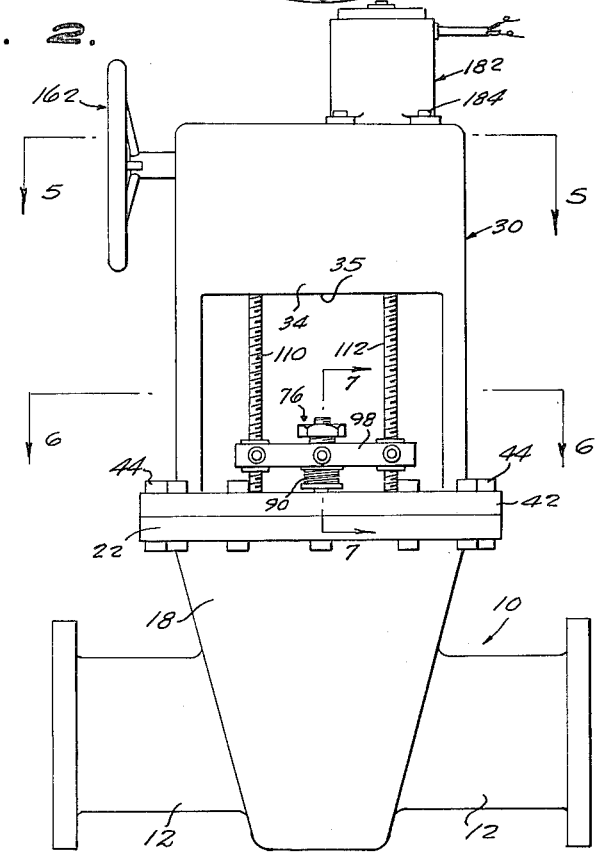
FIGURE 2 is a side elevation of FIGURE 1.

FIGURES 5 and 6 are horizontal sections taken on the lines 5—5 and 6—6, respectively, of FIGURE 2; and FIGURE 7 is an enlarged fragmentary section taken on the line 7—7 of FIGURE 2.

Referring in detail to the drawings, wherein like numerals designate like parts throughout the several views, the illustrated valve comprises a T-shaped valve body 10 having opposed and aligned normally horizontal tubular arms 12 having longitudinally spaced, downwardly convergent flat seats 14 which surround circular ports 16. An upwardly flaring tubular standard 18 connects the arms 12 and rises thereabove and has a flat circular upper surface 20 which is surrounded by an upstanding annular mounting flange 22. The interior walls 24 of the standard 18, above the valve seats 14, are plain cylindrical and define a cylindrical chamber 26 above the valve seats.

A valve operating assembly 28 is mounted upon the upper end of the standard 18, and comprises a vertically elongated rectangular closed housing 30, positioned in line with the valve body arms 12 and centered with respect to the standard. The housing 30 has end walls 32, side walls 34, a top wall 36, a bottom wall 38, and an intermediate horizontal wall 40. The bottom wall 38 is extended beyond the end and side walls as a circular flange 42 of the same diameter as the mounting flange 22. The flange 42 rests upon the mounting flange 22 and is removably fixed thereto, as by means of bolts 44. The lower parts of the side walls 34 can have openings 35, which expose components of the operating mechanism.

A circular stuffing box plate 46 rests upon the upper end surface 20 of the valve body standard 18, within the mounting flange 22, and is held down in place by the housing bottom wall 38. A stuffing box cup 48, containing a gland 49, is formed centrally in the plate 46 and has a central opening 50, in its bottom wall 52, which is aligned with a central bearing opening 54 in the housing bottom wall 38, through which a vertically movable valve disc operating shaft 56 slides.

The operating shaft 56 has diametrically opposed lateral arms 58, on its lower end, which have enlarged flat wedge heads 60, on their outer ends, which are disposed at similar downwardly converging angles. The heads 60, as shown in FIGURE 4, are rectangular and have their side edges slidably confined in transversely spaced vertical grooves 62, at the opposite sides of vertically elongated lost-motion slots 64, provided in the webs 66 of channel shaped holders 68, which are suitably affixed centrally to the facing surfaces 70 of circular valve discs 72, larger in diameter than the valve body ports 16. The slots 64 have closed upper ends 65 and open lower ends 67. The facing surfaces 70 of the valve discs have the same downward convergence as the valve ports 14, and the webs 66 of the holders 68 are spaced from and parallel to the facing surfaces. The operating shaft arms 58 work vertically through the web slots 64, and the holders 68 have openings 74, at their lower ends, large enough to pass the heads 60, enabling removal of the valve discs 72 from the operating shaft 56, when desired.

The outer surfaces of the heads 60 are wedgingly engaged with the facing surfaces 70 of the valve discs 72, so that downward movement of the operating shaft 56 serves to move the valve discs downwardly and wedge the valve discs apart and against the seats 14, for closing the ports 16, as shown in FIGURE 3. Upward movement of the operating shaft 56 causes the heads 60 to move upwardly relative to the holders 68 and the facing surfaces 70 of the valve discs, so that the valve discs are eased off the valve seats 14, and the valve discs are eventually moved upwardly off the seats, as the arms 58 reach and engage the upper ends 65 of the holder slots 64.

As shown in detail in FIGURE 7, the valve operating shaft 56 has threaded thereon and spaced above the housing bottom wall 38, a spring-cushioned drive connector, generally designated 76. The connector 76 comprises a vertically elongated sleeve 78 having a threaded bore 80 through which is threaded the threaded upper end 82 of the shaft 56. A ring 84 is slidably circumposed on the sleeve 78, and a stop nut 86 is threaded on the upper end of the sleeve, as indicated at 88, and is normally spaced above the ring 84. An expanding coil spring 90 is circumposed on the sleeve 78 and is compressed between the ring 84 and a lateral annular flange 92, on the lower end of the sleeve, the flange 92 being normally spaced above the housing bottom wall 38.

The ring 84 has diametrically opposed stub shafts 94 which extend through midlength or intermediate aligned holes 96 in longitudinally disposed cross bars 98, the stub shafts having grooves 100, in which snap rings 102 are securably engaged and bear against the outer surface of the ring 84. The cross bars 98 have aligned outer holes 104, adjacent their ends, through which extend stub shafts 106 of runner nuts 108, the stub shafts 106 being secured in place in the same way as the stub shafts 94.

The runner nuts 108 are threaded on vertical feed screws 110 and 112 which are located at and are equally spaced from opposite sides of the operating shaft 56. The feed screws have smooth lower end portions 114 which extend downwardly through openings 116 in the housing bottom wall 38. The openings 116 open into larger diameter recesses 118, which open to the lower side of the housing bottom wall 38, and contain lower anti-friction thrust bearings 120, through which the smooth portions 114 extend, with enlarged diameter heads 122, on the lower ends thereof, engaged with the undersides of the bearings and prevent upward movement of the feeder screws relative to the bearings.

The feeder screws have smooth upper end portions 124 which extend upwardly through openings 126 in the intermediate housing wall, and upwardly through upper anti-friction thrust bearings 128 which are seated in enlarged diameter recesses 130, to which the openings 126 open. Similar diameter gear wheels 132 and 134 are fixed, as indicated at 126 and 138, to the feeder screws 110 and 112, respectively, above the intermediate housing wall 40. The feed screw 110 has an extension 140 which reaches to the housing top wall 38, which terminates in a reduced diameter stub shaft 142 which is journaled in a socket 144 provided in the underside of the top wall. The gear wheel 132 has a tubular extension 146, on the extension 140, which has a bevel gear wheel 148 fixed on its upper end. The bevel gear wheel 148 is in mesh with a bevel pinion 150 which bears against a bearing boss 152 extending inwardly from the adjacent housing end wall. The boss 152 is tubular and surrounds a horizontal bearing bore 154 which extends through the housing side wall and through an external bearing boss 156 thereon. A rotary shaft 158, smaller in diameter than the pinion 150, extends through the bore 154 and is secured in the pinion and carries a hand wheel 162, on its outer end.

The feed screws 110 and 112 are operatively connected to rotate together for feeding the valve operating shaft 56 upwardly and downwardly, by means of a pinion 164 which is positioned between and is in mesh with the gear wheels 132 and 134. The pinion 164 is on the lower part of the vertical valve shaft 166 which has reduced diameter stub shafts 168 and 170, on its upper and lower ends, which turn in sockets 172 and 174, provided in the housing top wall 36 and intermediate wall 40, respectively. At its upper end the idler shaft 166 has a gear wheel 176 which is in mesh with a drive pinion 178 on a shaft 180 which extends downwardly through the housing top wall 36, from an electric motor 182 which rests upon the housing top wall 36, and is secured in place, as indicated at 184, at the side of the housing 30, remote from the hand wheel.

In operation, the valve discs 72 can be closed and opened either by rotating the hand wheel 162 in opposite directions or by the motor. In the case of an electric motor which is not reversible, operation thereof serves only to close the valve discs, and opening thereof is done by rotating the hand wheel 162. The motor 182 is connected to an energizing circuit (not shown) which contains limit switches which serve to limit the downward movement of the cross bars 98, and only partially compress the spring 90 of the spring-cushioned connector 76 downwardly against the sleeve flange 92, whereby, as the valve discs 72 make wedging contact with the valve seats 16, the spring is further but not fully compressed, and serves to hold the valve discs forcibly but yieldably against the seats 16. This action of the spring 90 serves to eliminate damage to the valve discs and the valve seats which could otherwise be produced by uncushioned downwardly operation of the operating shaft 56.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. Valve operating mechanism comprising a support, a pair of laterally spaced feed screws journaled on the support, a cross member extending between the feed screws and carrying runner nuts threaded on the feed screws, and a valve operating shaft having valve means on one end thereof, and a spring-cushioned connector operatively connecting the other end of the operating shaft to the cross member at a point between the feed screws, said connector comprising a sleeve threaded on the operating shaft and connected to said cross member, a ring sliding on the sleeve and connected to the cross member, and a coil spring circumposed on on the sleeve and compressed between the ring and a part of the sleeve, said valve means comprising a pair of laterally spaced valve discs disposed in convergent relationship, and wedge means fixed on said one end of the shaft disposed between and supportably and operatively engaged with the valve discs.

2. Valve operating mechanism comprising a support, a pair of laterally spaced feed screws journaled on the support, a cross member extending between the feed screws and carrying runner nuts threaded on the feed screws, and a valve operating shaft having valve means on one end thereof, and a spring-cushioned connector operatively connecting the other end of the operating shaft to the cross member at a point between the feed screws, said connector comprising a sleeve threaded on the operating shaft and connected to a cross member, a ring sliding on the sleeve and connected to the cross member, and a coil spring circumposed on the sleeve and compressed between the ring and a part of the sleeve, said valve means comprising a pair of laterally spaced valve discs disposed in convergent relationship, and wedge means fixed on said one end of the shaft disposed between and supportably and operatively engaged with the valve discs, said valve discs having convergent facing surfaces, holders fixed centrally on said facing surfaces, said wedge means having wedging contact with said surfaces, and lost motion means connecting the wedge means to the holders.

3. Valve operating mechanism comprising a support, a pair of laterally spaced feed screws journaled on the support, a cross member extending between the feed screws and carrying runner nuts threaded on the feed screws, and a valve operating shaft having valve means on one end thereof, and a spring-cushioned connector operatively connecting the other end of the operating shaft to the cross member at a point between the feed screws, said connector comprising a sleeve threaded on the operating shaft and connected to said cross member, a ring sliding on the sleeve and connected to the cross member, and a coil spring circumposed on the sleeve and compressed between the ring and a part of the sleeve, said valve means comprising a pair of laterally spaced valve discs disposed in convergent relationship, and wedge means fixed on said one end of the shaft disposed between and supportably and operatively engaged with the valve discs, said valve discs having convergent facing surfaces, holders fixed centrally on said facing surfaces, said wedge means having wedging contact with said surfaces, and lost motion means connecting the wedge means to the holders, in combination with a valve body on which said support is mounted, said valve body having tubular arms and ports registered with the facing ends of the arms, convergent valve seats surrounding the ports, said valve discs having outer surfaces engaged with the valve seats.

References Cited by the Examiner

UNITED STATES PATENTS

| | | | |
|---|---|---|---|
| 777,372 | 12/04 | Howard | 251—266 XR |
| 1,114,978 | 10/14 | Gamble | 251—130 |
| 1,775,999 | 9/30 | Haseloff | 251—85 |
| 2,600,115 | 6/52 | Kliewer | 251—167 |
| 3,038,692 | 6/62 | Holmes | 251—204 XR |
| 3,113,589 | 12/63 | Carr | 251—130 X |

FOREIGN PATENTS

| | | |
|---|---|---|
| 595,216 | 9/25 | France. |
| 996,298 | 8/51 | France. |
| 19,005 | 1891 | Great Britain. |

WILLIAM F. O'DEA, *Primary Examiner.*